June 10, 1924.

A. SEIDEMANN

TYPESETTING OR COMPOSING MACHINE

Filed Dec. 2, 1922   6 Sheets-Sheet 1

Inventor:
Arthur Seidemann
by Herbert W. P. Jenner,
Attorney

June 10, 1924.  1,497,386
A. SEIDEMANN
TYPESETTING OR COMPOSING MACHINE
Filed Dec. 2, 1922   6 Sheets-Sheet 2

Inventor
Arthur Seidemann
by Herbert W. Jenner,
Attorney.

June 10, 1924.  1,497,386

A. SEIDEMANN

TYPESETTING OR COMPOSING MACHINE

Filed Dec. 2, 1922   6 Sheets-Sheet 3

Inventor.
Arthur Seidemann
by Herbert W. Spenner
Attorney.

June 10, 1924.

A. SEIDEMANN 1,497,386

TYPESETTING OR COMPOSING MACHINE

Filed Dec. 2, 1922    6 Sheets-Sheet 4

June 10, 1924. 1,497,386
A. SEIDEMANN
TYPESETTING OR COMPOSING MACHINE
Filed Dec. 2, 1922 6 Sheets-Sheet 5

Inventor
Arthur Seidemann
by Herbert W. Spencer
Attorney.

Patented June 10, 1924.

1,497,386

UNITED STATES PATENT OFFICE.

ARTHUR SEIDEMANN, OF LIEGAU-AUGUSTUSBAD, GERMANY.

TYPESETTING OR COMPOSING MACHINE.

Application filed December 2, 1922. Serial No. 604,588.

*To all whom it may concern:*

Be it known that I, ARTHUR SEIDEMANN, a citizen of Germany, residing at Liegau-Augustusbad, in Saxony, Germany, have invented certain new and useful Improvements in Typesetting or Composing Machines; and I do hereby declare the following to be a full, clear, and exact description of the invention, such as will enable others skilled in the art to which it appertains to make and use the same.

My invention refers to a typesetting machine which, in consequence of its simplified construction, is particularly applicable for office purposes. It will work with types of any thickness, and belongs to the kind of setting machine having the types piled in adjacent magazine channels or grooves.

Machines of this kind are known in which the types are individually pushed out forwardly or upwardly. Such machines have been constructed in various manners, as for example, constructional forms are known in which the types are guided to the setting or composing case through hollow movable guiding channels or in which the types fall vertically through a channel to the setting case.

The object of the present invention is to simplify such machines with upward or forward type ejection by the use of an inclined sliding surface attached to the magazine channels and with a type galley attached below the discharge opening from the slide, the connections being made in such a manner that the type falls down over the sliding surface in the correct position for falling backwardly into the type galley.

It is known to employ inclined slide surfaces in composing machines, but in most cases hitherto this has been in conjunction with magazine channels in which the type is ejected downwardly under the pressure of the type pile. This method of ejecting the type has the disadvantage that the issuing type has the tendency, particularly at the last instant as it leaves the channel, to jump and topple over. Consequently inclined slide surfaces with this type of ejection apparatus have proved a failure.

With machines having the ejection of the type taking place freely at the top or forwardly, the inclined slide surface is very effective in use particularly in combination with a backwardly directed type galley.

In the new machine it is necessary to provide positive means for stripping the type from the magazine channels. As the type frequently sticks together, machines of this kind have the draw back that the type will not fall although free from the channel, and machines in which this is not taken into account are not useful.

For this reason it has already been proposed to remove the type from the magazines by stripping levers which are so arranged that the type pile under pressure is led against a stop until the leading type stands free from the support of the magazine, over the delivery channel. When a key is struck a stripping finger first pushes down the leading type, and then a bell-crank arrangement of the stripper forces the remainder of the type back so that it can exert no pressure on the leading type.

This arrangement is complicated as each separate type channel must have its own stripping device. Otherwise the pressing back of all the type piles with the help of the strong rubbing fingers entails considerable counterpressure and makes the serving of the machine very hard.

With these machines there is a further difficulty. If the type is of various thicknesses and the lift by which the type is raised to the outlet opening is constant, then the type outlet does not agree with the lift and the fall of the type is not regular. It may happen for example that two thin pieces of type fall at once.

It is an object of the invention to provide setting machines or automatic distributing machines with a transporting arrangement which, on the one hand, will ensure the falling of the type from the magazine channels, on the other hand will allow of the use of different thicknesses of letters and finally is operable with little effort so that it does not require a considerable amount of work to actuate the type keys.

For this purpose a device is disposed in front of the magazine channels which in the first place serves as an impact surface or stop for the issuing type, and secondly, strips it away from the remainder of the pile. This device can be carried out in various constructional forms.

For the guiding of the type as it falls from the above mentioned transporting device into the inclined slide, guide strips are provided according to this invention which are of angular form and suitably bent and are connected by cross strips, and together with a discharge chute cover form a detachable unit, the height of which above the slide can readily be adjusted. By this it is possible to entirely obviate the toppling over of the type as it falls, and also to accommodate different thicknesses of type. The type from any of the channels passing down the slide surface is directed to a common point.

It is known in these machines to let the type fall through an outlet opening at a common discharge point into the channels of a downwardly inclined type case. It is impossible in such a case to prevent the turning over and jamming of the type whilst it is falling freely into the channel. For this reason it has been proposed to slit the type on the underside and to let it slide down riding on ribs in the case. This construction, however, does not obviate the defect of the type toppling over because by the slitting the frictional surfaces are increased. In any case this requires a special construction of type and the universal application of the machine is impaired.

It is further known to let the type fall through a single opening into a horizontal type case and to press the fallen type into the channel by means of a rotatable eccentric arranged in front of the channel. This is done in such a manner that all the type already in the channel is moved further along and so leaves a place for the next succeeding type to enter. The continually rotating eccentric requires a motor drive for the machine. Besides, this kind of type introduction in consequence of the proportionately long travel of the eccentric, has a considerable retarding influence on the composing speed of the machine.

The invention is intended to avoid the faults of the known machines having a free type fall into the composing channel, by the employment of a laterally movable pusher device for introducing the type into the channel, which device needs no motor drive, but is operated solely by the pressing of a key. This is particularly important for small economical machines serving principally for office use.

It is necessary with this to provide an appliance for limiting the length of the lines of the composed matter in the channels of a setting galley or in a composing channel.

For this purpose in the galley a clamping piece is arranged as a type abutment which is provided with an external hand knob for engagement by an adjustable dog which can be set in desired position on a limiting bar which is adapted to set up a block in the key system.

This arrangement is particularly valuable with the galley formed as a one-line detachable composing channel because then the type abutment with the hand knob can be utilized to eject the composed matter onto a composing sheet or board.

Finally the invention also comprehends the provision in the machine of a switch-over device or shift key with the purpose of enabling, in a more simple manner every type lever to operate two adjacent type magazines.

Accordingly the ejector pawls which operate the ejectors for the type piles in the magazine channels are resiliently mounted in such a manner that their upper ends can be rocked sideways to engage either of two ejectors. This rocking of the ejector pawls is effected by means of a shift rod engaging all the pawls.

Various constructional forms of the invention are represented in the accompanying drawings.

Figure 14, is an enlarged perspective view of a switch over device.

Figure 14ª, shows in sectional view a resilient connection of an actuating rod to a type key.

Figure 1:
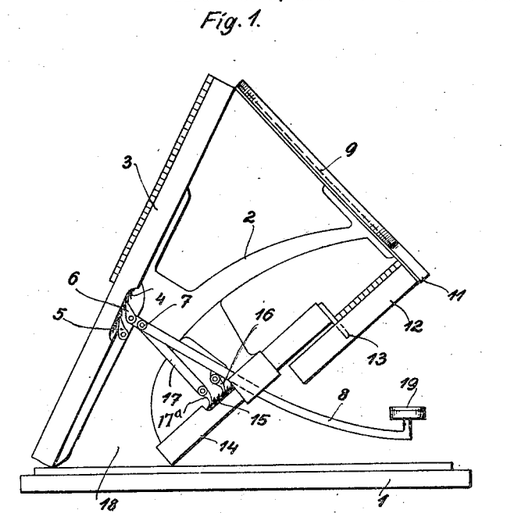
Figure 1, is a side view of a simple form of the invention.
Figure 2:
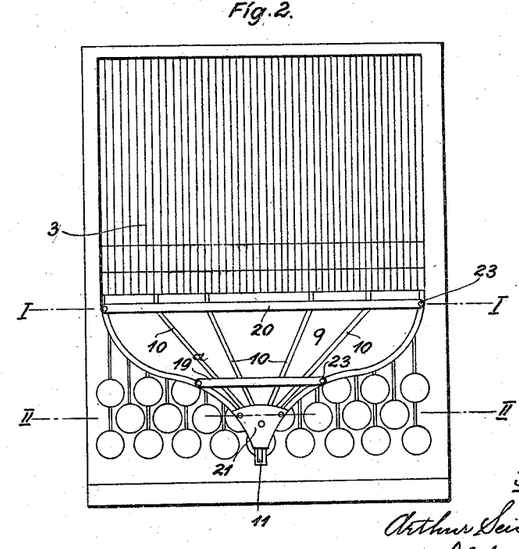
Figure 2, is a plan thereof.

The simple form of the machine represented in Figures 1 and 2 comprises a base plate 1 with a standard 2 supporting a number of inclined upwardly directed type magazine channels 3.

In these channels is arranged an ejecting rod or bar 4 provided on the underside with a toothed rack, and the downward movement of this rod or bar is checked by a spring catch 5. The toothed ejector is operated to strike against the lowermost type lying upon it by means of a suitable spring pawl 6 on a type lever 8 turning on trunnions 7.

At the upper outlet of the case of magazine channels 3 is attached a forwardly inclined or downwardly directed gliding plane or slide 9. On this are several converging guiding ribs 10 to conduct the type falling on the upper end of the slide into a common shoot leading to an opening 11 from which the type fall backwards into a type galley 12.

The construction of the galley can follow on known lines, but it is advantageous in the form of a one-line type channel which is detachable from the machine. It is then possible for the compositor in case of need to handle the set row for the purpose of justification. The type channel is indicated in the drawing at 12 and in it the lowermost type is supported by a projection 13 secured on a rack rod 14.

In the toothed rack 15 of this rod engages a shifting pawl 16 connected with the lever 8, whilst a catch pawl 17ª, on a fixed lever 17 prevents backward movement of the rack.

If a key 19 is pressed the pawl 6 raises the type pile in the corresponding magazine 3 and the pawl 16 effects a downward movement of the projection 13 in the type galley 12. A type falls out at the top of its magazine, slides over the surface 9 to the discharge opening 11 and falls backwardly through this onto the set type pile in the type galley.

After the filling of the type galley 12 this is removed and the composed matter is stripped therefrom. The arrangement has the advantage of being accessible on all sides, and further, owing to the forwardly-directed open type slide, it is possible for the compositor, if he has pressed a wrong key, to catch and abstract the incorrect type as it falls.

Figure 10:
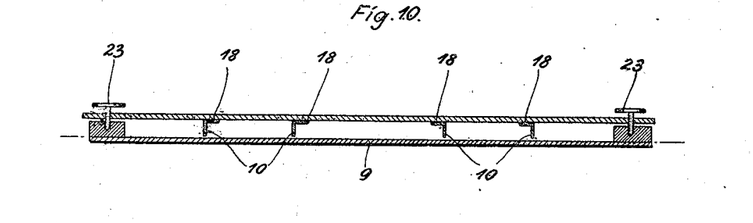
Figure 10, is a section on line 1—1 of Fig. 2.
Figure 11:
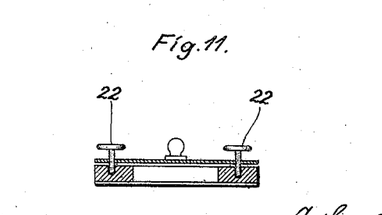
Figure 11, is a section on line II—II of Fig. 2.

The guiding ribs 10 are bent over at their upper edges (see Figure 10) so that their angular flanges 18 ensure a better guiding of the type. The type ribs 10 are connected by cross strips 19ª and 20 so as to form a detachable unit, which, if desired, may also be connected with a removable cover plate 21 for the shoot at the bottom of the type slide. This arrangement has the advantage that the detachable unit may quite readily be adjusted as to its height above the slide 9, as for example by set pins 22 and 23.

The above described embodiment is a rather primitive form of the machine to enable the main principles of the complete construction to be thoroughly understood.

More developed features of construction are shown in the other drawings.

At Figures 3 to 9 a particular arrangement is set forth which serves to extract the type from the type piles. The selected type advances in the magazine channels 3 upwardly to the outlet opening 25, then the separation of the raised type and its stripping off by means of a transporting device takes place.

Figure 3:
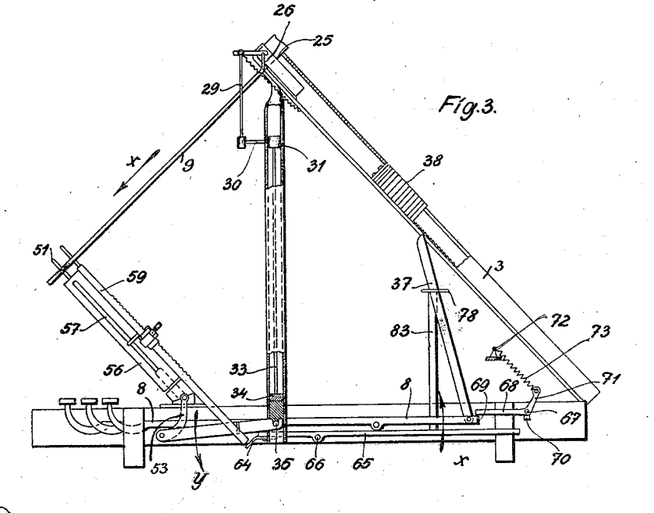
Figure 3, shows partly in section a more developed constructional form.
Figure 4:
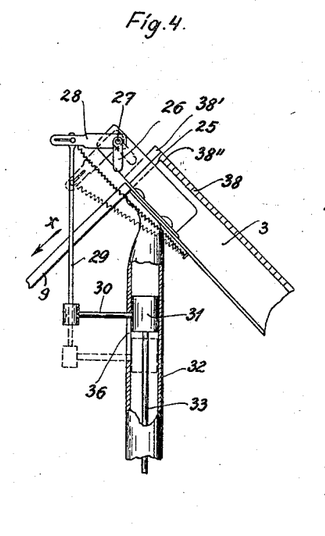
Figures 4 to 8 illustrate on a larger scale particular constructional forms of a type transporting arrangement.

In the example according to Figures 3 and 4 the transporting arrangement comprises a flat rail 26, arranged before the outlet openings 25 of all the adjacent magazine channels, which rail can be rocked upwardly and downwardly by means of a lever at the side into the different positions shown in Figure 4. This movement is effected through a rod 29 connected by a lateral rod 30 secured to a piston 31 which works in a tube 32 and is connected by a rod 33 to a second piston 34 whose movement is effected by a cross axle 35. This lies below the type lever 8 and rises and falls according to the movement of the lever. The lateral rod 30 works through a slot 36 of predetermined extent in the guide-tube 32 of the two pistons.

If a type key is struck the piston 34 and rod 33 are depressed and cause the rail 26 to take up the position shown in broken lines in Figure 4. Simultaneously the ejector pawl 37 pushes the type pile 38 upwardly and the leading type 38' comes into position against the forward edge of the rail 26. At that point the lift of the pile is ended and the leading type 38' is free from the groove or channel 3, whilst the next adjacent type 38'' in part is still engaged at its lower edge and retained. When the key lever is released the ejector pawl 37 returns again, the pressure on the type pile ceases, the rail 26 returns to the vertical position and rubbing lightly on the leading type 38' strips this away in the direction of the arrow $x$.

Figure 5:
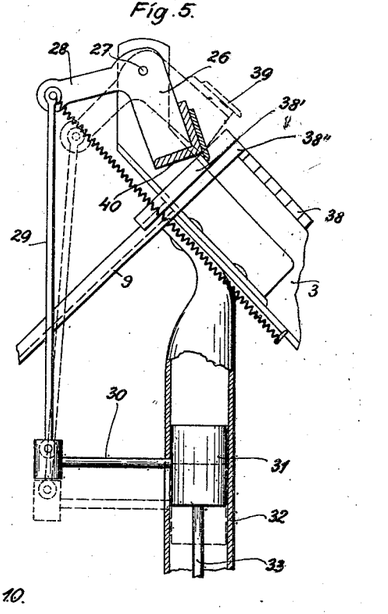

The arrangement according to Figure 5 is, in principle, the same as that in Figures 3 and 4 and similar reference figures are used to indicate similar parts. The difference in Figure 5 is that the swinging rail 26 has an angular form, one member 40 of which forms the impact surface or stop for the type and the other member 39 forms, or is provided with, a stripper for the leading type.

Figures 6, 7, 8, 9:
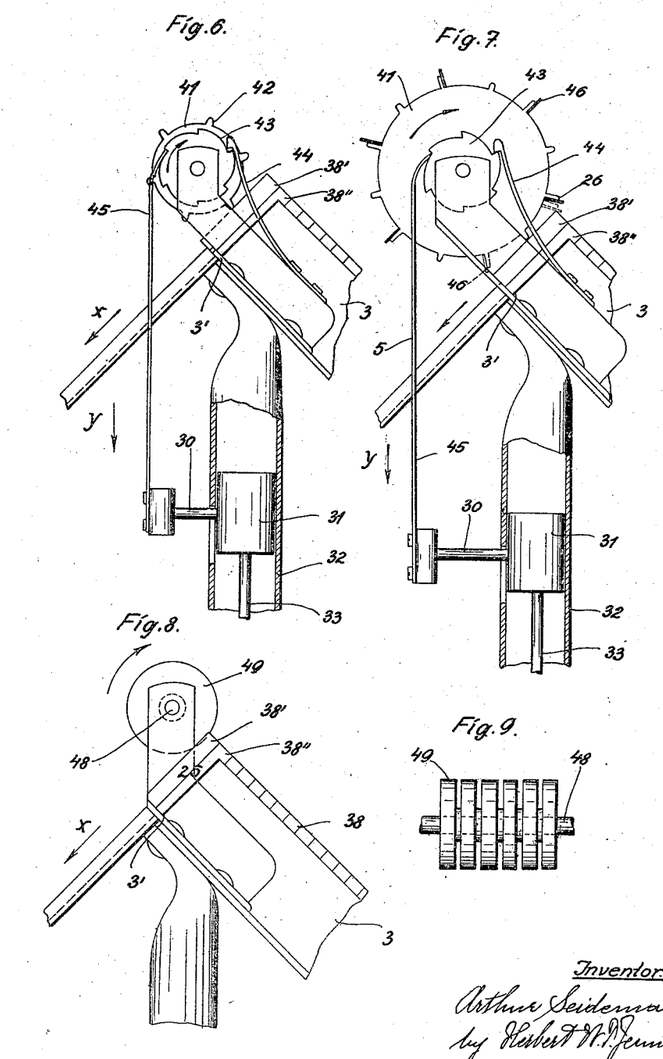
Figure 9, is a front view of part of Fig. 8.

In Figure 6 the stripping off arrangement is also employed except that the rocking rail 26 is replaced by an intermittently rotatable roller or cylinder 41 on the circumference of which radial ribs 42 are arranged. At one end the roller is connected to a ratchet wheel 43 which is retained against anti-clockwise rotation by a pawl 44 and is actuated in a clockwise direction by the piston 31 through a push pawl 45. Upon the operation of a key lever 8 the pawl 45 moves in the direction of the arrow $y$, and the type pile 38 moves so far forwardly that the leading type 38' comes against the radial rib 42 which is standing opposite to it. On the release of the key the push pawl 45 advances and actuates the roller 41 to the extent of one tooth of its ratchet. The edge of the rib 42 rubs lightly on the type 38', which is free from the lower edge 3' of the groove or channel 3, and strips is in the direction of the arrow $x$ and toward the collecting groove or setting galley.

A similar arrangement is shown in Figure 7 except that in this case radial strips 46 which are much higher than the ribs 42 of Fig. 6, are used and the type 38' which has been pushed forward arrives between two of these strips and rests against one of the intermediately arranged impact ribs 47. On the release of the key and the actuation of the roller for a step by the pawl 45 the type 38' is stripped off by the strip 46 engaging its upper edge as shown in dotted lines in Figure 7.

A further very simple construction is shown in Figures 8 and 9. In this case a resilient roller 49 of rubber or the like is mounted on the axle 48 and lies across the openings 25 of the type grooves or channels 3. The type 38' when pushed forward by the ejector presses itself with its highest edge into the roller and forms an angular depression in it. If now the pressure of the type lifting device is released the rubber surface springs out and the roller turns itself a little in the direction of the arrow $z$ and throws the type down in the direction of the arrow $x$.

The swinging rail 26 and also the actuated roll 41 may, if desired, be covered on their pressure surfaces with resilient substances. Such a covering is particularly useful in the embodiment shown in Figure 4.

The distance of the impact surface or stop from the outlets of the magazine grooves 3 is appropriately slightly larger than the thickest type. This also makes it possible to use type of unequal thickness in the machine.

The impact member can be provided with an additional check device in order to prevent the falling down of the freed type before the movement of the transporting member. This would operate to free the type as the action of the transporting member takes place. In Figure 7 one of the strips 46, which at this time is below the bottom edge of the type 38' serves this purpose.

Figure 12:
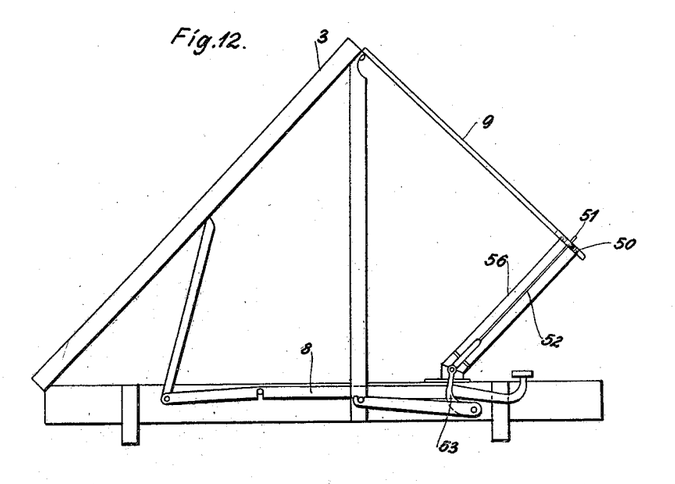
Figure 12, is a side view of the machine illustrated in Figure 3 and in particular illustrates the operation of the type pusher or feeder.
Figure 13:
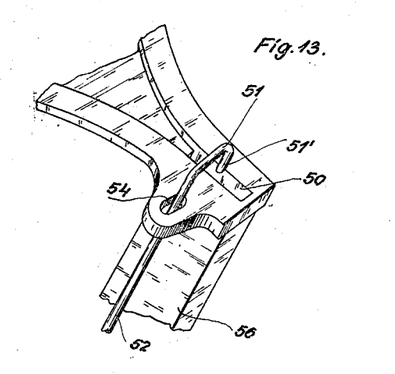
Figure 13, is a considerably enlarged perspective view of the pusher.
Figures 15, 16:
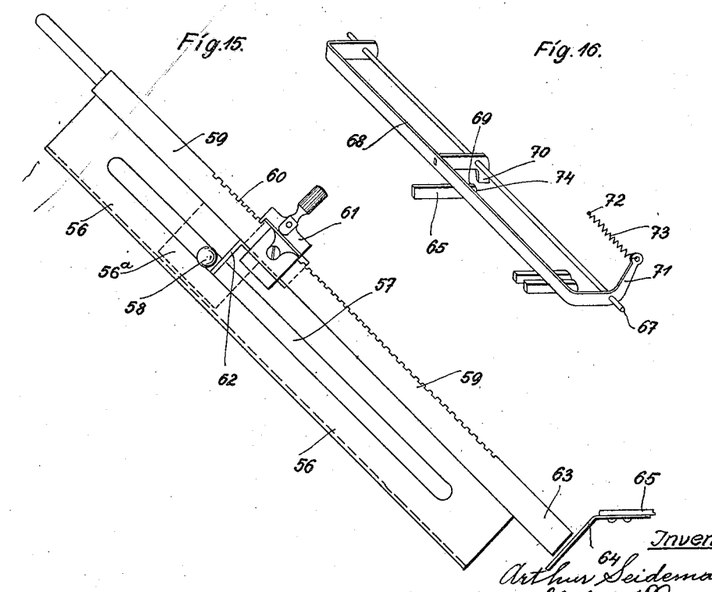
Figure 15, is an enlarged representation of the type galley and the line limiting device.
Figure 16, shows in perspective a part of the line limiting device.

The introduction of the type, stripped off by the above described arrangements, into the type galley is effected by the employment at the bottom of the slide 9 of a stop device illustrated particularly in Figures 12 and 13. The stripped-off type falls down the surface 9 to the common discharge opening 50 which communicates directly with the type channel 56. In this is adjustably arranged an abutment 56ª for the type which is shown in Figure 15 in a position which it assumes when the channel is approximately half full of type.

In front of the discharge opening 50 is arranged the hook-like pusher 51 provided with the rod or stem 52 which is attached to the lever 53, which in turn is operated in any suitable manner at each depression of one of the keys 8. The rod 52 is guided in an elongated hole 54 to enable the pusher to be moved laterally away from the opening 50 in case of any interruption of the working occurring at this point. In order to hold the pusher 51 continually exactly over the middle of the opening 50, the rod 52 is connected to the lever 53 with a spring blade 55 against the lever so that the spring always presses the rod and pusher over towards the opening 50.

With this arrangement in operation, when a type has slidden down the surface 9 into the opening 50, if a key 8 is depressed the rod 52 is drawn down and the pusher 51 with its end 51' enters the opening and pushes the type, lying in the opening, into the composing channel. When the key is released the lever 53, the rod 52 and the pusher 51 return so that the opening is free for the reception of the next succeeding type which falls as the key is released.

In consequence of the very simple manner in which the rod 52 of the pusher may be connected to any member which is influenced by all the keys an effective working of the device can be ensured under all circumstances.

The limiting of the length of the lines of type set or composed in the galley is accomplished by the line-limiting device illustrated more particularly in Figures 3, 15 and 16.

In the setting or composing channel 56 is installed an abutment piece 56ª which with a slight pressure can be readily adjusted lengthwise, and which carries a pressure knob 58 projecting through a slot in the side of the channel 56. Parallel to the channel 56 is arranged a movable limiting rod 59, and on a toothed rack portion thereof rides a travelling dog 61, of any suitable known construction, which can be easily located in any position on the rack. The dog 61 carries at the side a striking surface 62 which lies in the path of pressure knob 58 of the type abutment piece 56ª.

The limiting rod 59 takes its position with its lower end 63 against a suitable spring extremity 64 of an intermediate lever 65 which is fulcrumed on a horizontal axis 66. In the rear part of the machine, on an axle 67, is rotatably mounted a stirrup lever 68 which engages above the forward ends of all the type-ejector keys or levers 8.

In the middle of the stirrup 68 is a cranked nose 70 which lies within reach of the end of the intermediate lever 65, whilst at the side of the stirrup is a lever arm 71 under the influence of a spring 73 anchored to a suitable point 72 on the machine standard.

If the type abutment 56ª is pushed so far down in the channel by the pushing in of type, that its knob 58 is forced against the striker 62 of the dog 61, then by the further pushing in of type the limiting rod 59 is also carried down and thereby actuates the lever 65 raising its front end in the direction of the arrow $x$ so that this end 74 is brought into the path of the nose 70. When this has happened nothing more can be composed. If now it is sought to press a key in the direction of the arrow $y$ its outer end 69 cannot rise because the stirrup 68 cannot yield. When the device is not checked in this manner, so that it is as shown in Fig. 3, if a type ejector key be pressed it can function because the stirrup is free to move upwardly against the tension of the spring 73, for in this position the nose 70 is not opposed by the end of the intermediate lever 65.

The abutment 56a has a further purpose as it serves, when, after filling, the channel 56 is removed from the machine, to eject the composed matter from the channel and deposit it on a suitable compositor's sheet or board.

Figures 14, 14A:
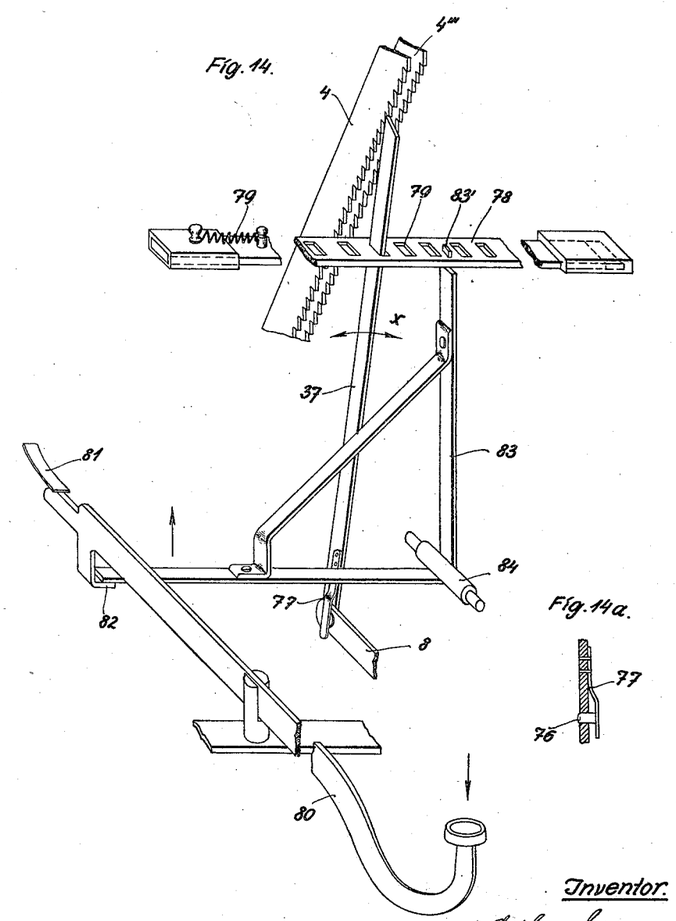

In order to be able to work the machine with a switching over or shift-key mechanism a suitable device for this purpose is shown in Figure 14. Each of the ejector pawls 37 which engage the toothed type ejectors 4, is yieldingly connected to the corresponding key 8 by a spring pin 76 attached to a blade spring 77 (Figure 14a) and engaging corresponding holes in the pawl 37 and key 8. This connection which is not novel per se, has the advantage in this case of permitting the pawl 37 an elastic lateral movement, as shown by the double arrow $x$, without disturbing its connection. All the ejector pawls 37 are engaged in a corresponding number of holes 79 of a switch or shift bar 78 and the shift bar 78 is retained in a definite normal position by a tension spring 79.

There are twice as many magazine channels 3 provided with type ejectors 4 as there are pawls 37 and these magazine channels are so charged with letters and signs so that the normal letters of the key board are exchangeable, upon the switch over, with the signs given on the same keys.

The change over is effected with the help of a key lever or shift key 80 in normal position by a blade spring 81. The shift key 80 is provided with a cranked tongue 82 engaging an intermediate shift lever which in this example is shown as a bell crank lever 83 mounted on the axle 84 and with its upper end 83' engaging the shift bar 78.

When composing is carried out on the key board without the switch over being used the ejector pawls 37 engage in the teeth of the ejectors 4, but when the shift key 80 is depressed the rods 37 are rocked over to the right by the bar 78 and then engage the ejectors 4'''. This construction of switch over arrangement is of particular value as being extremely simple and cheap to produce.

The invention which resides in the above described devices and their combination is not restricted to the particular examples of its embodiment given above.

Having now particularly described and ascertained the nature of my said invention and in what manner the same is to be performed, I declare that what I claim is:—

1. Type composing or setting machine comprising in combination a series of type magazine channels, a key system and means connected with the keys for ejecting type from the upper ends of said channels, an inclined slide leading from the discharge ends of said magazine channels, and a type setting galley in communication with said slide, said slide being common to all of said channels and leading to a discharge opening communicating with said galley.

2. Type composing or setting machine comprising in combination a series of type magazine channels, a key system and means connected with the keys for ejecting type from the upper ends of said channels, an inclined slide leading from the discharge ends of said magazine channels, and a type setting galley in communication with said slide, said slide being common to all of said channels and leading to a discharge opening communicating with said galley, and said galley being downwardly and backwardly inclined from the discharge opening in said slide.

3. Type composing or setting machine, comprising in combination a series of type magazine channels, a key system and means connected with the keys for ejecting type from the upper ends of said channels, an inclined slide leading from the discharge ends of said magazine channels, means for receiving the impact of the type as it is ejected from the channels and for stripping it away from the remaining type and onto said slide, and a type setting galley in communication with said slide, said slide being common to all of said channels and leading therefrom to a discharge opening communicating with said galley.

4. Type composing or setting machine, comprising in combination a series of type magazine channels, a key system and means connected with the keys for ejecting type from the upper ends of said channels, an inclined slide leading from the discharge ends of said magazine channels, means for receiving the impact of the type as it is ejected from the channels and for stripping it away from the remaining type and onto said slide, said means being located in front of the discharge ends of all the magazine channels and serving to transport the type in correct position onto the slide, a type setting galley in communication with the slide by means of a discharge opening in said slide, and said slide being common to all of said magazine channels and leading therefrom to the said discharge opening.

5. Type composing or setting machine, comprising in combination a number of type magazine channels, a type ejector device connected with a key system and operating to eject type from the upper ends of the said channels, a single inclined slide leading from the discharge end of all the magazine channels, an impact device for receiving the impact of the type ejected from any of the channels, said device having means for stripping the ejected type from the remaining type and for transporting it to said slide, guiding means on said slide leading to a discharge opening therein, a cover for the discharge end of said slide, said cover and said guiding means being adjustable and removable, and a type galley in communication with the discharge opening of said slide.

6. Type composing or setting machine, comprising in combination a plurality of type magazine channels, a type ejector key system operating to eject type from the upper ends of the said channels, a single inclined slide leading from the discharge ends of all the magazine channels, a type setting galley in communication with said slide, means for receiving the type as it is ejected from the channels and for stripping it from the remaining type onto said slide, and a laterally movable pusher device at the bottom of the slide for stuffing the type into the galley.

7. Type composing or setting machine, comprising in combination a plurality of type magazine channels, a type ejector key system operating to eject type from the upper ends of the said channels, a single inclined slide leading from the discharge ends of all the magazine channels, a type setting galley in communication with said slide, means for receiving the type as it is ejected from the channels and for stripping it from the remaining type onto said slide, and a laterally movable pusher device at the bottom of the slide for stuffing the type into the galley, said pusher device being resiliently mounted in a slot so that it can be rocked to one side and having a spring to return it to normal position.

8. Type composing or setting machine comprising in combination a series of type magazine channels, a key system and means connected with the keys for ejecting type from the upper ends of said channels, a single inclined slide leading from the discharge ends of said magazine channels, and a type setting galley in communication with said slide, said slide being common to all of said channels and leading to a discharge opening communicating with said galley, and said galley having a single line channel and being readily removable so that type composed in it can be ejected.

9. Type composing or setting machine comprising in combination a series of type magazine channels, a key system and means connected with the keys for ejecting type from the upper ends of said channels, an inclined slide leading from the discharge ends of said magazine channels, and a type setting galley in communication with said slide, said slide being common to all of said channels and leading to a discharge opening communicating with said galley, a type channel in said galley and an abutment for the type slidable under pressure within said channel, a line limiting device working in conjunction with said abutment and operating a block in the key system when said abutment reaches a predetermined position.

10. Type composing or setting machine comprising in combination a series of type magazine channels, a key system and means connected with the keys for ejecting type from the upper ends of said channels, an inclined slide leading from the discharge ends of said magazine channels, and a type setting galley in communication with said slide, said slide being common to all of said channels and leading to a discharge opening communicating with said galley, and said galley having a single line channel and being readily removable so that type composed in it can be ejected, a type abutment slidable under pressure within said channel, and a projection from said abutment working through a slot in the wall of said channel so as to serve as an ejector for the composed matter when the type galley is removed.

11. Type composing or setting machine comprising in combination a series of type magazine channels, a key system and means connected with the keys for ejecting type from the upper ends of said channels, an inclined slide leading from the discharge ends of said magazine channels, and a type setting galley in communication with said slide, said slide being common to all of said channels and leading to a discharge opening communicating with said galley, a type channel in said galley, and an abutment for the type slidable under pressure within said channel, a line-limiting bar associated with said galley with an adjustable dog projecting therefrom, an external knob connected with said abutment, said knob engaging said dog when a predetermined length of line is attained, and a lever actuated by said dog and its bar to effect a block in the type key system.

12. Type composing or setting machine comprising in combination a series of type magazine channels, rack ejectors in said channels for ejecting type therefrom, pawls connecting said rack ejectors with a type key lever system, an inclined slide leading from the discharge ends of all of said magazine channels and a type setting galley in communication with said slide, said connecting pawls being resiliently connected to the type key and one pawl being provided for a pair of rack ejectors, a shift key in said system and a switch bar engaging the pawls so that each pawl can be engaged at will with either of the corresponding pair of rack ejectors in adjacent magazine channels.

13. Type composing or setting machine, comprising in combination a series of type magazine channels discharging at their upper ends, type ejecting means in said channels connected with a series of type keys, a downwardly inclined slide secured with its upper end adjacent to the discharge ends of the magazine channels, an impact device for the ejected type to impinge against as it leaves the channel, said device comprising a transverse roller supported at the upper end of the channels and the slide, said roller having means for receiving the type, and means for engaging the ejected type and positively stripping it from the remaining type in the channel as the roller is actuated thus transporting the type onto the slide, intermittent means for actuating the roller; a discharge opening at the bottom of the slide, means to guide the type on the slide to said opening and a type on the slide to said opening and a type composing galley in communication with said opening to receive the type from said slide.

14. Type composing or setting machine, comprising in combination a series of type magazine channels discharging at their upper ends, type ejecting means in said channels connected with a series of type keys, a downwardly inclined slide secured with its upper end adjacent to the discharge ends of the magazine channels, an impact device for the ejected type to impinge against as it leaves the channel, said device comprising a transverse roller supported at the upper end of the channels and the slide, said roller having means for receiving the type, and means for engaging the ejected type and positively stripping it from the remaining type in the channel as the roller is actuated thus transporting the type onto the slide, said stripping means consisting of spaced radial ribs on said roller with intermediate impact ribs between the stripping ribs to hold the type until the roller is actuated, intermittent means for actuating the roller; a discharge opening at the bottom of the slide, means to guide the type in the slide to said opening and a type composing galley in communication with said opening to receive the type from said slide.

15. Type composing of setting machine, comprising in combination a series of type magazine channels discharging at their upper ends, type ejecting means in said channels connected with a series of type keys, a downwardly inclined slide secured with its upper end adjacent to the discharge ends of the magazine channels, an impact device for the ejected type to impinge against as it leaves the channel, said device comprising a transverse roller supported at the upper end of the channels and the slide, said roller having means for receiving the type, and means for engaging the ejected type and positively stripping it from the remaining type in the channel as the roller is actuated thus transporting the type onto the slide, intermittent means for actuating the roller; said intermittent means consisting of a ratchet device worked by a plunger device connected with the type key system so as to be actuated when any key is struck, a discharge opening at the bottom of the slide, means to guide the type on the slide to said opening, and a type composing galley in communication with said opening to receive the type from said slide.

16. Type composing or setting machine comprising in combination a number of type magazine channels discharging at their upper ends, type ejecting means in said channels connected with a series of type keys, a downwardly inclined slide supported with its upper end adjacent to the discharge ends of the magazine channels and common to all of said channels to receive type ejected from any one thereof, a type stopping and stripping device at the junction of the channels and the slide, a discharge opening at the bottom of the slide, and a type composing galley in communication with said opening, said slide converging from its upper end to said opening, guiding ribs on said slide and a cover at the lower end of said slide, said ribs being connected together by cross pieces, and said cover being connected to said ribs and forming together therewith a removable unit, and means for rendering said cover adjustable with respect to its height above said slide.

In testimony whereof I hereunto affix my signature in the presence of two witnesses.

ARTHUR SEIDEMANN.

Witnesses:
A. MEVER,
MARCELLA E. KITTREDGE.